(12) United States Patent  
Tuuk et al.

(10) Patent No.: US 8,145,876 B2
(45) Date of Patent: Mar. 27, 2012

(54) ADDRESS TRANSLATION WITH MULTIPLE TRANSLATION LOOK ASIDE BUFFERS

(75) Inventors: Michael Edward Tuuk, Austin, TX (US); Michael Clark, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 546 days.

(21) Appl. No.: 11/834,478

(22) Filed: Aug. 6, 2007

(65) Prior Publication Data

US 2009/0043985 A1 Feb. 12, 2009

(51) Int. Cl.
*G06F 12/00* (2006.01)
(52) U.S. Cl. .................................. 711/207; 711/221
(58) Field of Classification Search .................. 711/207, 711/221
See application file for complete search history.

(56) References Cited

U.S. PATENT DOCUMENTS

| | | | |
|---|---|---|---|
| 4,980,816 A * | 12/1990 | Fukuzawa et al. | 711/207 |
| 6,075,938 A * | 6/2000 | Bugnion et al. | 703/27 |
| 7,222,221 B1 * | 5/2007 | Agesen et al. | 711/141 |
| 2004/0143720 A1 * | 7/2004 | Mansell et al. | 711/206 |
| 2005/0027960 A1 * | 2/2005 | DeMent et al. | 711/207 |
| 2005/0050277 A1 * | 3/2005 | Shen et al. | 711/118 |
| 2005/0273561 A1 * | 12/2005 | Siegel et al. | 711/133 |
| 2006/0064567 A1 * | 3/2006 | Jacobson et al. | 711/207 |
| 2006/0259732 A1 * | 11/2006 | Traut et al. | 711/173 |
| 2006/0271760 A1 * | 11/2006 | Nicolai | 711/207 |
| 2007/0113044 A1 * | 5/2007 | Day et al. | 711/207 |
| 2007/0294505 A1 * | 12/2007 | Traut et al. | 711/207 |
| 2008/0016315 A1 * | 1/2008 | Cohen et al. | 711/207 |
| 2008/0155168 A1 * | 6/2008 | Sheu et al. | 711/6 |
| 2008/0222383 A1 * | 9/2008 | Spracklen et al. | 711/207 |
| 2008/0235487 A1 * | 9/2008 | Illikkal et al. | 711/207 |
| 2009/0013149 A1 * | 1/2009 | Uhlig et al. | 711/207 |
| 2009/0292899 A1 * | 11/2009 | Mansell et al. | 711/207 |

* cited by examiner

*Primary Examiner* — Reba I Elmore

(57) ABSTRACT

A data processing device employs a first translation lookaside buffer (TLB) to translate virtual addresses to physical addresses. If a virtual address to be translated is not located in the first TLB, the physical address is requested from a set of page tables. When the data processing device is in a hypervisor mode, a second TLB is accessed in response to the request to access the page tables. If the virtual address is located in the second TLB, the hypervisor page tables are bypassed and the second TLB provides a physical address or information to access another table in the set of page tables. By bypassing the hypervisor page tables, the time to translate an address in the hypervisor mode is reduced, thereby improving the efficiency of the data processing device.

19 Claims, 5 Drawing Sheets

ADDRESS TRANSLATION WITH MULTIPLE TRANSLATION LOOK ASIDE BUFFERS

FIELD OF THE DISCLOSURE

The present disclosure relates to data processing devices, and more particularly to address translation for data processing devices.

BACKGROUND

Data processing devices can employ virtual addressing schemes to address memory space. An operating system at the data processing device provides virtual addresses to hardware that translates the virtual addresses to a system physical address which is used to access memory. In order to translate a virtual address to a system physical address, the translation hardware typically employs a set of page tables. The first page table in the set of page tables is addressed using a portion of the virtual address to access address information, such as a base address. The base address information is combined with a second portion of the virtual address to access a second page table. Each page table in the set is accessed in succession based on address information provided by the previous page table and a portion of the virtual address until the final page table is accessed to retrieve the system physical address associated with the virtual address. This traversal of the set of page tables is referred to as a page walk.

The page walk process can be more complex for data processing devices that employ a hypervisor. The hypervisor supervises memory accesses of one or more operating systems executing at the data processor. Accordingly, the hypervisor isolates the system physical addresses from each operating system by translating the addresses provided by each OS page table, referred to as guest physical addresses, to system physical addresses. For example, the hypervisor can require an additional set of page tables to be traversed between each access to the first set of page tables in order to obtain the system physical address information for the subsequent access. While this ensures that the hypervisor controls the address translation, it can also undesirably increase the amount of time used to translate the virtual address, thereby reducing the efficiency of memory accesses at the data processing device. Accordingly, there is a need for an improved address translation device and methods.

DETAILED DESCRIPTION

A data processing device employs a first translation look-aside buffer (TLB) to translate virtual addresses to physical addresses. If a virtual address to be translated is not located in the first TLB, the physical address is requested from a set of page tables. When the data processing device is in a hypervisor mode, a second TLB is accessed in response to the request to access the page tables. If the virtual address is located in the second TLB, the hypervisor page tables are bypassed and the second TLB provides a physical address or information to access another table in the set of page tables. By bypassing the hypervisor page tables, the time to translate an address in the hypervisor mode is reduced, thereby improving the efficiency of the data processing device.

Figure 1:
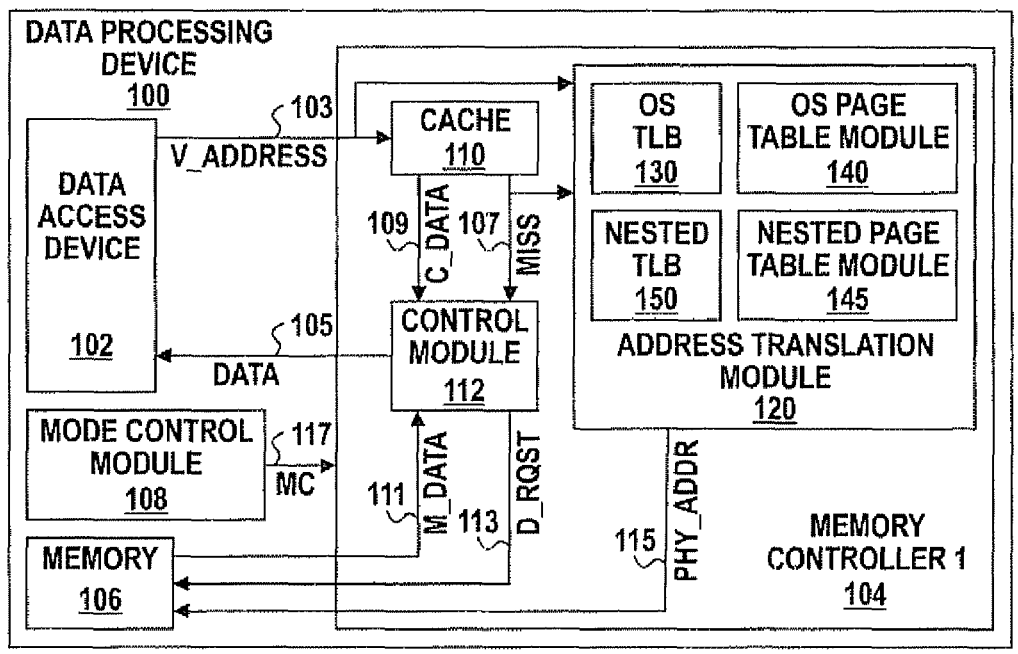
FIG. 1 is a block diagram of a data processing device in accordance with at least one embodiment of the present disclosure.

Referring to FIG. 1, a block diagram of a data processing device 100 is illustrated. The data processing device 100 can be a computer system, a general purpose data processor, such as a microprocessor, an application specific integrated circuit (ASIC), and the like. The data processing device includes a data access device 102, a memory controller 104, a memory 106, and a mode control module 108.

The data access device 102 can be a processor core or other module configured to request data from the memory 106. The data access device 102 includes an output connected to a bus 103 to provide a signal labeled V_ADDRESS and an input connected to a bus 105 to receive a signal labeled DATA.

The memory 106 can be volatile memory, such as random access memory (RAM), or non-volatile memory, such as flash memory or a hard drive. The memory 106 includes an input to connected to a bus 113 to receive a signal labeled D_RQST, an input connected to a bus 115 to receive a signal labeled PHY_ADDR, and an output connected to a bus 111 to receive a signal labeled M_DATA. The mode control module includes an output connected to a bus 117 to provide a signal labeled MC. The memory controller 104 includes an input connected to the bus 103, an input connected to the bus 117, an input connected to the bus 111, an output connected to the bus 105, and an output connected to the bus 113.

In operation, the mode control module 108 is configured to determine the mode of operation for the data processing device 100. The data processing device 100 can operate in a normal mode and a hypervisor mode. In the normal mode, a normal operating system is executed at the data processing device 100 that controls the interface between other software and hardware modules of the data processing device 100, such as the memory controller 104. In particular, in the normal mode the normal operating system controls data transfers between software and the memory 106 by providing data access requests to the memory controller 104. In the hypervisor mode the data processing device 100 executes a hypervisor operating system. The hypervisor operating system provides an interface between one or more normal operating systems and the hardware modules of the data processing device 100. In particular, in the normal mode the hypervisor operating system controls data transfers between the memory 106 and the normal operating systems.

The mode control module 108 can determine the mode of operation by reading the state of an external pin (not shown) of the data processing device 100, by reading the state of a storage location such as an internal register (not shown) and the like. The mode control module 108 includes an output to provide a signal, labeled MC, to indicate whether the data processing device 100 is in a normal mode or a hypervisor mode.

In both the normal mode and the hypervisor mode, the data access device 102 is configured to provide virtual address information via the V_ADDRESS signal and receive data associated with virtual address information via the DATA signal. The memory controller 104 is configured to retrieve data associated the virtual address information and provide the data via the DATA signal.

The memory controller 104 includes a cache 110, a control module 112, and an address translation module 120. The cache 110 includes an input connected to the bus 103, an output connected to a bus 107 to provide a signal labeled MISS, and an output connected to a bus 109 to provide a signal C_DATA. The control module 112 includes an input connected to the bus 107, an input connected to the bus 109, an input connected to the bus 111, an output connected to the bus 113, and an output connected to the bus 105. The address translation module 120 includes an input connected to the bus 103, an input connected to the bus 107, and an output connected to the bus 115.

The cache 110 is configured to receive virtual address information via the V_ADDRESS signal and determine whether data associated with the virtual address information is stored at the cache 110. If the data is stored at the cache 110 a cache hit occurs and the cache 110 provides the data via the C_DATA signal to the control module 112. If the data associated with the virtual address information is not located at the cache 110, a cache miss is indicated via an asserted MISS signal.

The control module 112 is configured to determine whether a cache miss has occurred based on the received MISS signal. If a cache hit occurs the control module 112 is configured to provide the data received from the cache 110 via the C_DATA signal to the data access device 102 via the DATA signal. In addition, in response to the cache hit indicated by the MISS signal the address translation module stops translation of the virtual address information received via the V_ADDRESS signal. If a cache miss occurs, e.g. the MISS signal is asserted, the control module 112 waits for the address translation module 120 to provide a physical address via the PHY_ADDR signal and asserts the D_RQST signal. This indicates to the memory 106 that it should retrieve data associated with the system physical address provided via the PHY_ADDR signal by the address translation module 120. The memory 106 provides the retrieved data via the M_DATA signal. The control module 112 in turn provides the retrieved data to the data access device 102 via the DATA signal.

The address translation module 120 is configured to receive virtual address information via the V_ADDRESS signal and translate the virtual address information to a physical address, and provide the system physical address via the PHY_ADDR signal. In order to translate the virtual address information, the address translation module 120 includes an OS TLB 130, an OS page table module 140, a nested page table module 145, and a nested TLB 150. The OS TLB 130 is configured to store a set of virtual address information and the system physical address associated with each virtual address associated with the stored set of virtual address information. The OS page table module 140 is configured to store a set of page tables associated with an operating system being executed at the data processing device, and is further configured to perform a page walk on those tables based on the virtual address information. The nested page table module 145 is configured to store a set of page tables associated with an hypervisor operating system being executed at the data processing device, and is further configured to perform a page walk on those tables based on the virtual address information. It will be appreciated that although for purposes of discussion the OS page table module 140 and the nested page table module 145 are illustrated as separate modules, in a particular embodiment the two modules could be implemented as a single module. The nested TLB 150 is configured to store a set of virtual address information and additional address information associated with each stored virtual address for use in the hypervisor mode.

The way in which the address translation module 120 translates the virtual address information to a system physical address depends on the mode of operation indicated by the MC signal. In both the normal mode and the hypervisor mode, the address translation module 120 first determines whether the OS TLB 130 stores the virtual address information. If the OS TLB 130 stores the virtual address, the address translation module 120 retrieves the associated system physical address from the OS TLB 130 and provides it via the PHY_ADDR signal.

If the OS TLB 130 does not store the virtual address, it requests the address translation module 120 to retrieve the address from the OS page table module 140. In response, if the MC signal indicates that the data processing device 100 is in the normal mode, the address translation module 120 instructs the OS page table module 140 to perform a page table walk to retrieve the system physical address.

If the MC signal indicates that the data processing device 100 is in the hypervisor mode, the address translation module 120 attempts to retrieve page table address information from the nested TLB 150 based on the virtual address information. If the nested TLB 150 includes the virtual address information received via the V_ADDRESS signal, it provides associated address information that the address translation module 120 uses to access the OS page table module 140. For example, the nested TLB 150 can provide a system physical address that is a base address to be used to access the next OS page table. If the nested TLB 150 does not include the virtual address information received via the V_ADDRESS signal, the address translation module 120 accesses the nested page table module 145 to retrieve the page table address information from a set of nested page tables associated with the hypervisor operating system.

The address translation module 120 provides the retrieved page table address information to access a page table at the OS page table module 140. The OS page table at the OS page table module 140 provides a guest physical address that the address translation module 120 provides to the nested TLB 150. If the nested TLB 150 includes the guest physical address, it provides associated address information that the address translation module uses to access a subsequent page table at the OS page table module 140. If the nested TLB 150 does not include the guest physical address, the address translation module 120 provides the guest physical address to the nested page table module 145 for translation. The result of this translation is provided to access the next page table at the OS page table module 140. The address translation module 120 continues to retrieve guest physical address information from the OS page table module and use the nested TLB 150 and nested page table module 145 until a system physical address has been determined. In this way the hypervisor operating system controls the translation of the virtual address information to a system physical address. By using the nested TLB 150 to retrieve system physical addresses (either the translated system physical address or intermediate system physical addresses used to access OS page tables), the address translation module omits one or more accesses to the nested page table module during the page walk process, thereby improving the efficiency of the page walk in the hypervisor mode and reducing the time required to translate the virtual address information. This in turn allows the memory controller 104 to retrieve data more quickly, improving the efficiency of the data processing device 100.

Figure 2:
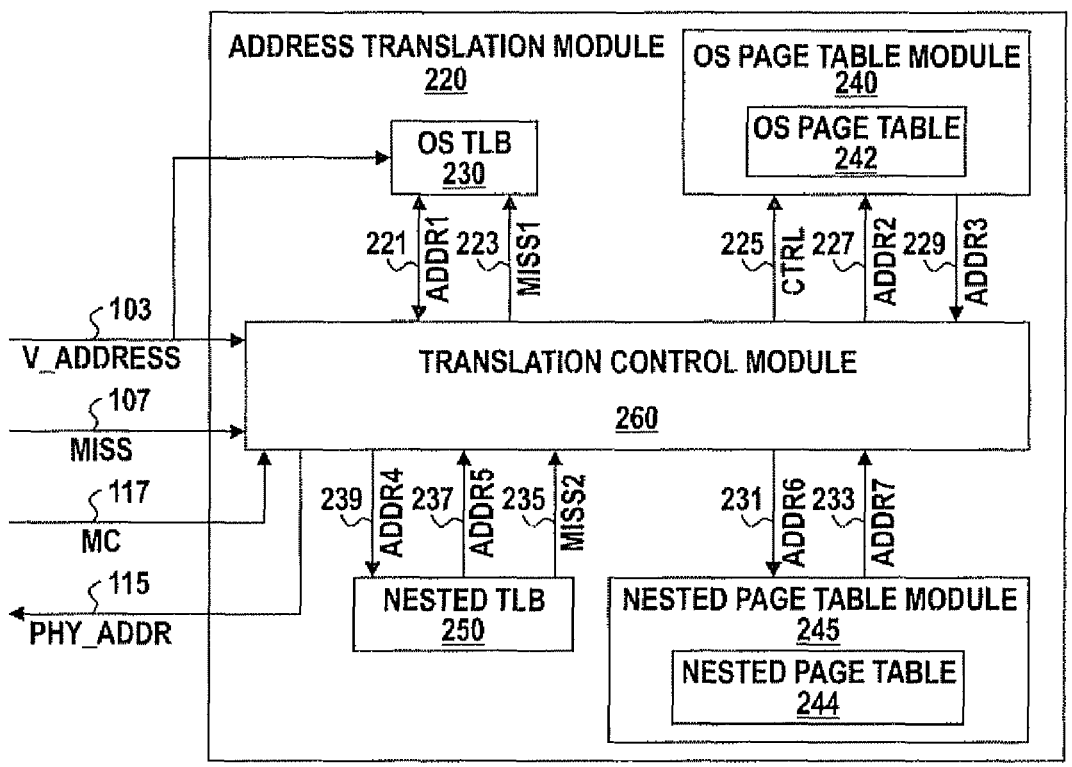
FIG. 2 is a block diagram of a particular embodiment of an address translation module of the data processing module of FIG. 1.

Referring to FIG. 2, a block diagram of a particular embodiment of an address translation module 220, corresponding to the address translation module 120 of FIG. 1, is illustrated. The address translation module 220 includes an OS TLB 230, an OS page table module 240, a nested page table module 240, a nested TLB 250, and a translation control module 260. The OS TLB 230 includes an input connected to the bus 103, an input/output connected to a bus 221 to provide a signal labeled ADDR1, and an output connected to a bus 223 to provide a signal labeled MISS1. The OS page table module 240 includes an input connected a bus 225 to receive a signal labeled CTRL, an input connected to a bus 227 to receive a signal labeled ADDR2, and an output connected to a bus 229 to provide a signal labeled ADDR3. The nested page table module 245 includes an input connected to a bus 231 to receive a signal labeled ADDR6, and an output connected to a bus 233 to provide a signal labeled ADDR7. The nested TLB 250 includes an input connected to a bus 239 to receive a signal labeled ADDR4, an output connected to a bus 237 to provide a signal labeled ADDR5, and an output connected to a bus 235 to provide a signal labeled MISS2. The translation control module 260 includes an input connected to the bus 107, an input connected to the bus 223, an input connected to the bus 103, an input connected to the bus 117, an input connected to the bus 229, an input/output connected to the bus 221, an output connected to the bus 115, an output connected to the buss 225, an output connected to the bus 227, an output connected to the bus 231, and an output connected to the bus 239. In addition, the OS page table module 240 includes a set of OS page tables 242, and the nested page table module 245 includes a set of nested page tables 244.

In operation, the OS TLB 230 is configured to receive virtual address information via the V_ADDRESS bus and determine if it stores an associated system physical address. If the OS TLB 230 does store a system physical address associated with the received virtual address, it provides the system physical address to the translation control module 260 via the ADDR1 signal and indicates a TLB hit via the MISS1 signal. In response, the translation control module 260 determines if a cache miss has occurred based on the MISS signal. If so, the translation control module 260 provides the physical address received via the ADDR1 signal to the memory 106 via the PHY_ADDR signal. If a cache hit occurs, the translation control module 260 does not provide the system physical address, and can also indicate to the OS TLB 230 via a control signal (not shown) that it can cease retrieving a system physical address for the received virtual address information.

If the OS TLB 230 does not include a system physical address associated with the received virtual address information, it indicates a TLB miss via the MISS1 signal. This TLB miss indicates a request to the translation control module to perform a page walk of the OS page tables 242 to retrieve the physical address associated with the virtual address information.

Figure 3:
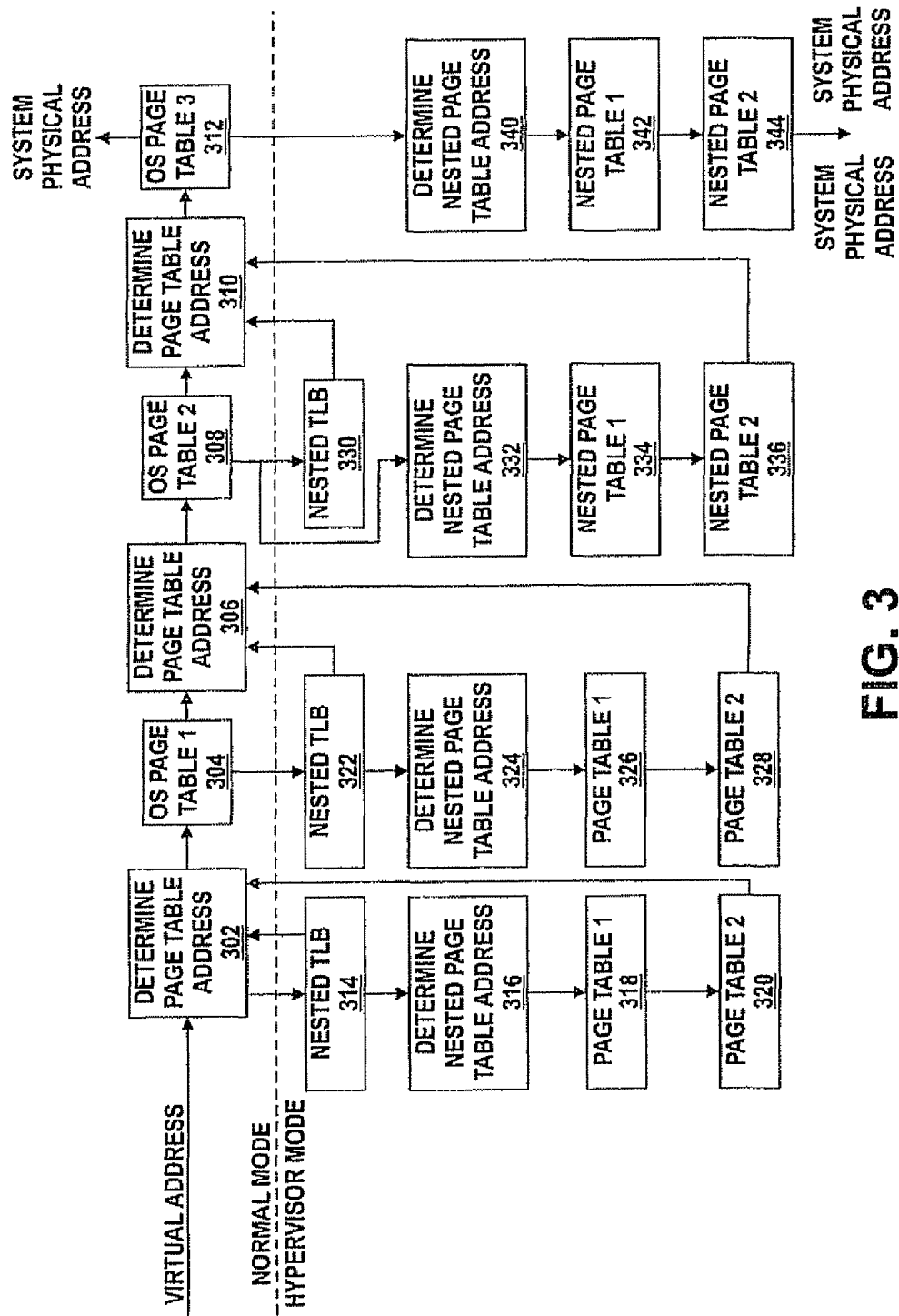
FIG. 3 is a flow diagram illustrating a particular embodiment of the operation of the address translation module of FIG. 2.

The operation of the address translation module 220 when performing a page walk can be better understood with reference to FIG. 3. FIG. 3 illustrates a flow diagram of a particular embodiment of a method of performing a page walk. At block 302 the translation control module 260 determines page table address information for a first of the OS page tables 242 based on the virtual address information received via the V_ADDRESS signal. In a particular embodiment, the translation control module concatenates a portion of the received virtual address information with a predetermined base address to determine a physical address for a page table entry.

If the MC signal indicates that the data processing device 100 is in the normal mode, the method flow moves to block 204 and the translation control module 240 provides the page table address information to the OS page table module 240 via the ADDR2 signal. The translation control module 260 can also provide control information via the CTRL signal indicating which of the OS page tables 242 should be accessed with the provided page table address information. The OS page table module 240 accesses one of the OS page tables 242 based on the page table address information to retrieve a base address for the subsequent page table in the page walk. The OS page table module 240 provides this base address to the translation control module via the ADDR3 signal.

At block 306, the translation control module 260 determines page table address information based on the received base address. In a particular embodiment, the translation control module 260 determines the page table address information by concatenating the base address with a portion of the virtual address information received via the V_ADDRESS signal.

At block 308, the translation control module 260 provides the page table address information to the OS page table module 240 via the ADDR2 bus. The OS page table module 240 accesses one of the OS page tables 242 based on the page table address information to retrieve a system physical base address for the subsequent page table in the page walk. The OS page table module 240 provides this base address to the translation control module 260 via the ADDR3 signal.

At block 310, the translation control module 260 determines page table address information based on the received base address. At block 312, the translation control module 260 provides the page table address information to the OS page table module 240 via the ADDR2 bus. The OS page table module 240 accesses one of the OS page tables 242 based on the page table address information to retrieve system physical address information for the virtual address information received via the V_ADDRESS signal. The OS page table module 240 provides the physical address information to the translation control module 260 via the ADDR3 signal. The translation control module 260 in turn provides the physical address information via the PHY_ADDR bus.

If, at block 302, the translation control module 302 determines, based on the MC signal, that the data processing device 100 is in the hypervisor mode, the translation control module 260 provides the page table address information to the nested TLB 214. The nested TLB 250 determines if it stores page table access information, such as a system physical address for the first OS page table entry, associated with the received nested page table address information. If so, the nested TLB provides the page table access information to the translation control module 260 via the ADDR5 signal. At block 302, the translation control module 260 provides the received page table address information to the OS page table module 240 via the ADDR2 signal. At block 304, the OS page table module 240 uses the received page table address information to access one of the OS page tables 242 to retrieve base address information for a subsequent OS page table.

If, at block 314, the nested TLB 250 determines that it does not store page table address information associated with the received nested page table address information, it indicates a TLB miss via the MISS2 signal. In response, at block 316, the translation control module 260 determines nested page table address information for the page table address information. In a particular embodiment, the nested page table address information is determined by concatenating a portion of the received virtual address with the page table address information determined at block 302. The translation control module 260 provides the nested page table access information to the nested page table module at block 245 via the ADDR6 signal.

The nested page table module 245 uses the nested page table access information to access one of the nested page tables 244 and thereby determine nested page table access information for another of the nested page tables 244. The nested page table module 245 provides the determined nested page table access information to the translation control module 260 via the ADDR7 signal.

The translation control module 260 determines that the page walk of the nested page tables 244 is not complete, and, at block 320 provides the nested page table access information to the nested page table module 245 via the ADDR6 signal. In response, the nested page table module 245 determines page table access information by using the nested page table access information to access one of the nested page tables 244. The nested page table module 245 provides the page table access information to the translation control module 260. At block 302, the translation control module 260 provides the received page table address information to the OS page table module 240 via the ADDR2 signal. At block 304, the OS page table module 240 uses the received page table address information to access one of the OS page tables 242 to retrieve guest physical address information for a subsequent OS page table.

The OS page table module 240 provides the retrieved guest physical address information to the translation control module 260 via the ADDR3 signal. If the data processing device 100 is in the hypervisor mode, the translation control module 260, at block 322, provides the guest physical address information to the nested TLB 250 via the ADDR4 signal. The nested TLB 250 determines if it stores the guest page table address information. If so, the nested TLB provides page table access information associated with the guest page table address information to the translation control module 260 via the ADDR5 signal. At block 306, the translation control module 260 provides the received page table address information to the OS page table module 240 via the ADDR2 signal. At block 308, the OS page table module 240 uses the received page table address information to access one of the OS page tables 242 to retrieve base address information for a subsequent OS page table.

If, at block 322, the nested TLB 250 determines that it does not store page table address information associated with the received nested page table address information, it indicates a TLB miss via the MISS2 signal. In response, at block 324, the translation control module 260 determines nested page table address information based on the retrieved guest physical address. In a particular embodiment, the translation control module 260 determines the nested page table access information by concatenating the received guest physical address information with a portion of the received virtual address information. At block 326, the translation control module 260 provides the nested page table access information to the nested page table module at block 245 via the ADDR6 signal. The nested page table module 245 uses the nested page table access information to access one of the nested page tables 244 and thereby determine nested page table access information for another of the nested page tables 244. The nested page table module 245 provides the determined nested page table access information to the translation control module 260 via the ADDR7 signal.

The translation control module 260 determines that the page walk of the nested page tables 244 is not complete, and, at block 328 provides the nested page table access information to the nested page table module 245 via the ADDR6 signal. In response, the nested page table module 245 determines page table access information by using the nested page table access information to access one of the nested page tables 244. The nested page table module 245 provides the page table access information to the translation control module 260. At block 306, the translation control module 260 provides the received page table address information to the OS page table module 240 via the ADDR2 signal. At block 308, the OS page table module 240 uses the received page table address information to access one of the OS page tables 242 to retrieve guest physical address information for a subsequent OS page table.

The OS page table module 240 provides the guest physical address information to the translation control module 260 via the ADDR3 signal. If the data processing device 100 is in the hypervisor mode, the translation control module 260, at block 330, provides the guest physical address information to the nested TLB 250 via the ADDR4 signal. The nested TLB 250 determines if it stores the received guest physical address information. If so, the nested TLB provides page table access information associated with the received guest physical address information to the translation control module 260 via the ADDR5 signal. At block 310, the translation control module 260 provides the received page table address information to the OS page table module 240 via the ADDR2 signal. At block 312, the OS page table module 240 uses the received page table address information to access one of the OS page tables 242 to retrieve guest physical address information associated with the page table address information.

If, at block 330, the nested TLB 250 determines that it does not store page table address information associated with the received guest physical address information, it indicates a TLB miss via the MISS2 signal. In response, at block 332, the translation control module 260 determines nested page table access information based on the guest physical address and provides the nested page table access information to the nested page table module at block 245 via the ADDR6 signal. The nested page table module 245 uses the nested page table access information to access one of the nested page tables 244 and thereby determine nested page table access information for another of the nested page tables 244 at block 334. The nested page table module 245 provides the determined nested page table access information to the translation control module 260 via the ADDR7 signal.

The translation control module 260 determines that the page walk of the nested page tables 244 is not complete, and, at block 336 provides the nested page table access information to the nested page table module 245 via the ADDR6 signal. In response, the nested page table module 245 determines page table access information by using the nested page table access information to access one of the nested page tables 244. The nested page table module 245 provides the page table access information to the translation control module 260. At block 310, the translation control module 260 provides the received page table address information to the OS page table module 240 via the ADDR2 signal. At block 312, the OS page table module 240 uses the received page table address information to access one of the OS page tables 242 to retrieve guest physical address information and provides the guest physical address information to the translation control module via the ADDR3 signal.

At block 340, the translation control module 260 determines nested page table address information based on the received guest physical address information and provides the nested page table access information to the nested page table module at block 245 via the ADDR6 signal. In response, at block 342 the nested page table module 245 determines page table access information by using the nested page table access information to access one of the nested page tables 244. The nested page table module 245 provides the determined nested page table access information to the translation control module 260 via the ADDR7 signal.

The translation control module 260 determines that the page walk of the nested page tables 244 is not complete, and, at block 344 provides the nested page table access information to the nested page table module 245 via the ADDR6 signal. In response, the nested page table module 245 determines system physical address information by using the nested page table access information to access one of the nested page tables 244. The nested page table module 245 provides the system physical address information to the translation control module 260 via the ADDR5 bus, which in turn provides the system physical address information via the PHY_ADDR bus.

It will be appreciated that, although in the illustrated embodiment the nested TLB 250 was not accessed for the final translation to the system physical address, in an alternative embodiment the nested TLB 250 could be used to determine the final translation to the system physical address.

Figure 4:
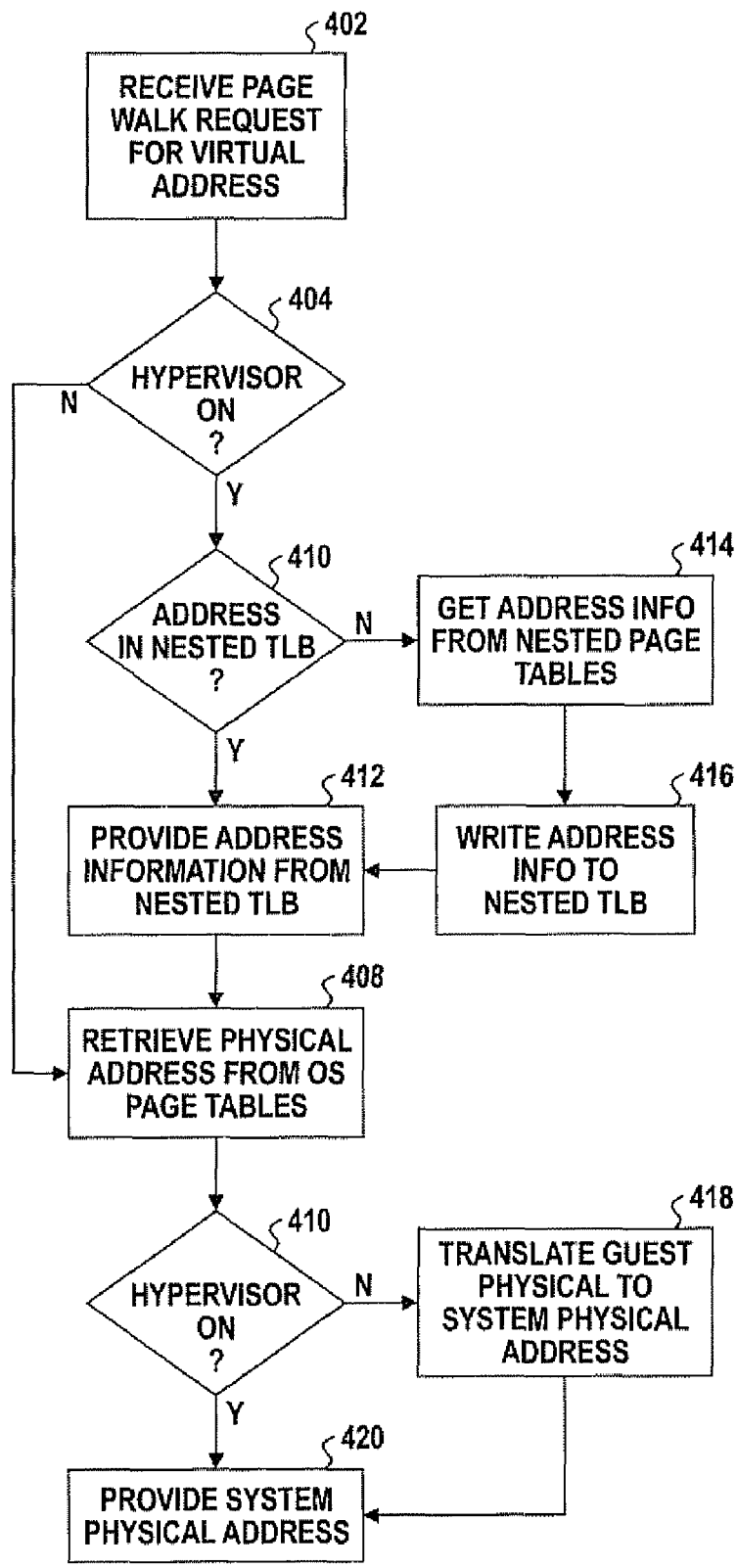
FIG. 4 is a flow diagram of a particular embodiment of a method of translating a virtual address.

Referring to FIG. 4, a flow diagram of a particular embodiment of a method of translating a virtual address is illustrated. At block 402, a page walk request is received from a TLB or other module for a particular virtual address. At block 404, it is determined whether a hypervisor mode for a data processing device is on. If not, the method flow moves to block 408 and the data processing device retrieves the physical address from a set of OS page tables based on the virtual address. The method flow proceeds to block 410 and the physical address is provided to a memory or other module of the data processing device.

Returning to block 404, if the hypervisor mode is on the method flow moves to block 410 and the data processing device determines whether address information associated with the virtual address is stored in a nested TLB. If so, the method flow moves to block 412 and the data processing device retrieves page table address information from the nested TLB. The method flow moves to block 408 and the retrieved page table address information is used to retrieve a physical address from the OS page tables. The method flow moves to block 410, and it is determined whether the hypervisor mode is on. If not, this indicates that the physical address retrieved from the OS page tables is a system physical address, and the method flow proceeds to block 420, where the system physical address is provided. If, at block 410, it is determined that the hypervisor mode is on, this indicates that the physical address retrieved from the OS page tables is a guest physical address. Accordingly, the method flow moves to block 418 and the guest physical address is translated to a system physical address. In a particular embodiment, the guest physical address is determined by accessing the nested TLB. The method flow proceeds to block 420 and the system physical address associated with the virtual address is provided.

Returning to block 410, if address information associated with the virtual address is not stored in the nested TLB, the method flow moves to block 414 and address information associated with the virtual address is retrieved from a set of hypervisor tables. The method flow moves to block 416 and the retrieved address information is stored in the nested TLB. The method flow proceeds to block 412 and the retrieved and stored address information is provided from the nested TLB. At block 408 the provided address information is used to retrieve a physical address from the OS page tables. The method flow moves to block 410 and it is determined whether the retrieved physical address is a guest physical or system physical address. If, at block 410, it is determined that the hypervisor mode is off, this indicates that the physical address retrieved from the OS page tables is a system physical address, and the method flow proceeds to block 420, where the system physical address is provided. If, at block 410, it is determined that the hypervisor mode is on, this indicates that the physical address retrieved from the OS page tables is a guest physical address. Accordingly, the method flow moves to block 418 and the guest physical address is translated to a system physical address. In a particular embodiment, the guest physical address is determined by accessing the nested TLB. The method flow proceeds to block 420 and the system physical address associated with the virtual address is provided.

Figure 5:
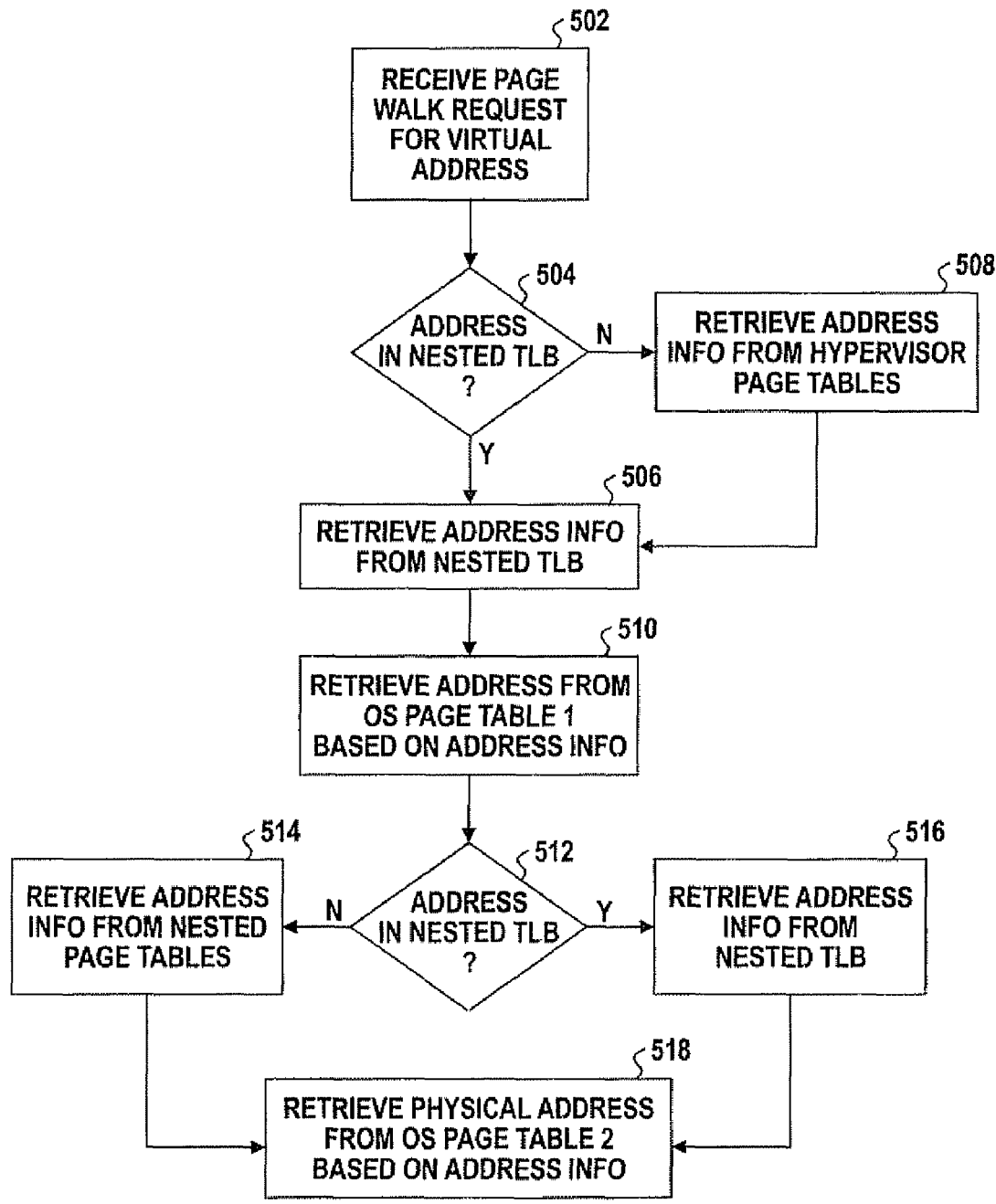
FIG. 5 is a flow diagram of an alternative embodiment of a method of translating a virtual address.

Referring to FIG. 5, a flow diagram of a particular embodiment of a method of translating a virtual address to a physical address is illustrated. The flow diagram of FIG. 5 assumes that a data processing device is in hypervisor mode. At block 502, a request to perform a page walk for a virtual address is received from a TLB or other module of the data processing device. The method flow moves to block 504 and the data processor determines whether the received virtual address is stored in a nested TLB. If not, the method flow moves to block 508 and address information, such as page table index information, is retrieved from a set of hypervisor page tables. If, at block 504, the nested TLB does store the virtual address, the method flow moves to block 506 and the address information is retrieved from the nested TLB.

The method flow moves to block 510 and the retrieved page table address information is used to retrieve page table address information for a subsequent page table from a first OS page table. At block 512, the data processing device determines whether the address information provided by the first OS page table is stored in the nested TLB. If not, the method flow moves to block 514 and the data processing device retrieves address information, based on the address information provided by the first OS page table, from the set of hypervisor page tables, the method flow moves to block 518 and a physical address is retrieved from a second OS page table. In a particular embodiment, this physical address is a guest physical address that is further translated by a hypervisor in order to obtain a system physical address. If, at block 512, the address information provided by the first OS page table is stored in the nested TLB, address information associated with the provided address information is retrieved from the nested TLB at block 516. The method flow moves to block 518, where the retrieved address information is used to access a second OS page table in order to retrieve a physical address.

Figure 6:
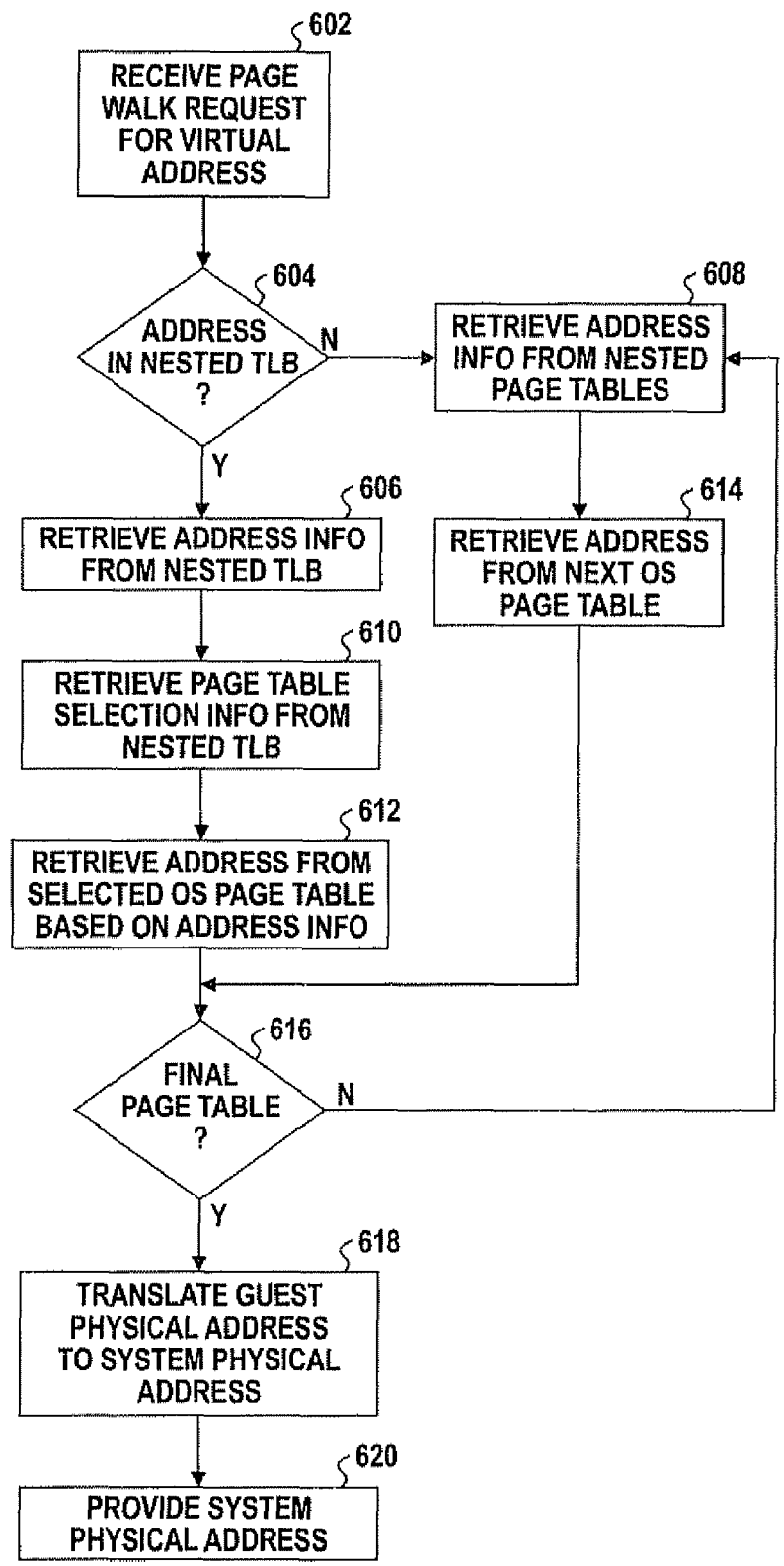
FIG. 6 is a flow diagram of another particular embodiment of a method of translating a virtual address.

Referring to FIG. 6, a flow diagram of a particular embodiment of a method of translating a virtual address to a physical address is illustrated. At block 602 a page walk request for a virtual address is received from a TLB or other module of a data processing device. In response, at block 604 the data processing device determines whether the address information based on the virtual address is stored in a nested TLB. In a particular embodiment, the address information is determined by concatenating a portion of the virtual address with a base physical address. If the address information is not located in the nested TLB, the method flow moves to block 608 and the data processing device retrieves address information from a set of hypervisor page tables based on address information that is based on the virtual address (e.g. address information formed by concatenating a portion of the virtual address with a base address). The method flow proceeds to block 614 where the retrieved address information is used to access address information in the next page table of a set of OS page tables. The method flow moves to block 616, where the data processing device determines whether the accessed OS page table is the final table in the set. If so, this indicates that the accessed address information is the physical address, and the method flow moves to block 618, where the physical address is provided to a memory or other module of the data processing device. If, at block 616, it is determined that the final page table was not accessed, the method flow returns to block 608, and the data processing device continues to page walk the hypervisor and OS page tables in succession until the final table is reached.

Returning to block 604, if the address information based on the virtual address is located in the nested TLB, the method flow moves block 606 and address information associated with the virtual address is retrieved from the nested TLB. The method flow proceeds to block 610 and the data processing device 610 retrieves page table selection information associated with the virtual address from the nested TLB. This page table selection information can be part of the retrieved address information. The page table selection information indicates which OS page table should be accessed with the retrieved address information. This provides for greater flexibility in the hypervisor, and can improve both hypervisor efficiency and security. For example, by changing the page table accessed depending on the virtual address, more complex page walk schemes can be implemented, making it more difficult for malicious software to emulate the hypervisor, thereby improving security.

At block 612, address information is retrieved from the selected OS page table based on the retrieved address information. The method flow proceeds to block 616, where the data processor determines whether the final OS page table has been accessed in the page walk. If not, the method flow returns to block 608. If so, the method flow moves to block 618, where the retrieved guest physical address is translated to a system physical address. In a particular embodiment, this translation is performed by determining whether the guest physical address is stored in the nested TLB. If so, the associated system physical address is retrieved from the nested TLB. If the guest physical address is not stored in the nested TLB, a page walk is performed on the nested page tables to determine the system physical address. At block 620, the system physical address is provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. For example, although various page tables are illustrated as stored at an address translation module, some or all page tables can also be stored at memory external to the address translation module. It should be understood that various changes can be made in the function and arrangement of elements without departing from the scope of the invention as set forth in the appended claims and the legal equivalents thereof.

What is claimed is:

1. A method, comprising:
    determining if address information associated with a virtual address is located in a first translation look-aside buffer (TLB);
    sending a first request for the address information in response to determining that the virtual address is not located in the first TLB, the first request for address information requesting information from a first page table; and
    in response to determining a processor device is in a hypervisor mode of operation:
        accessing a second TLB based on the virtual address in response to the first request to determine a guest physical address; and
        accessing the first page table based on the guest physical address; and
    in response to determining the processor device is in a non-hypervisor mode of operation, accessing the first page table based on the virtual address without accessing the second TLB.

2. The method of claim 1, wherein accessing the second TLB comprises:
    determining if the address information associated with the virtual address is located in the second TLB; and
    accessing a second page table different from the first page table in response to determining that the virtual address is not located in the second TLB.

3. The method of claim 2, wherein the first page table is associated with a first operating system and the second page table is associated with a second operating system.

4. The method of claim 1, wherein accessing the second TLB comprises:
    receiving first address information from the second TLB in response to determining the first address information is associated with the virtual address; and
    accessing one of a plurality of page tables based on the first address information.

5. The method of claim 4, wherein accessing the second TLB further comprises:
    receiving second address information from the one of the plurality of page tables in response to determining the second address information is associated with the first address information; and
    accessing the second TLB based on the second address information.

6. The method of claim 5, wherein accessing the second TLB based on the second address information comprises:
    receiving third address information from the second TLB in response to determining the third address information is associated with the second address information; and
    accessing a second of the plurality of page tables based on the third address information.

7. The method of claim 1, wherein accessing the second TLB comprises:
    receiving first address information from the second TLB in response to determining the first address information is associated with the virtual address;
    selecting a first of a plurality of page tables based on the first address information; and
    accessing the first of the plurality of page tables based on the first address information.

8. The method of claim 7, wherein accessing the second TLB further comprises:
    receiving second address information from the first of the plurality of page tables in response to accessing the first of the plurality of page tables; and
    accessing the second TLB based on the second address information.

9. The method of claim 8, wherein accessing the second TLB based on the second address information comprises:
    receiving third address information from the second TLB in response to determining that the third address information is associated with the second address information;
    selecting a second of the plurality of page tables based on the third address information; and accessing the second of the plurality of page tables based on the third address information.

10. A method, comprising:
receiving a request to translate a virtual address to a physical address; and
in response to determining a mode of operation of a processing device is hypervisor mode:
   in response to determining that the virtual address is not stored in a first translation look-aside buffer (TLB), sending a first request for the physical address from a first plurality of page tables;
   in response to the first request, receiving first address information from a second TLB;
   determining the physical address based on the first address information; and
   storing the physical address.

11. The method of claim 10, wherein determining the physical address comprises accessing the first plurality of page tables based on the first address information.

12. The method of claim 11, wherein accessing the first plurality of page tables comprises:
accessing a first page table of the first plurality of page tables based on the first address information to determine second address information;
accessing a second plurality of page tables based on the second address information to determine third address information; and
accessing a second page table based on the third address information to determine the physical address.

13. The method of claim 12, further comprising determining the first page table based on the first address information.

14. The method of claim 12, wherein the first plurality of page tables is associated with a first operating system and the second plurality of page tables is associated with a second operating system.

15. The method of claim 14, wherein the second operating system is a hypervisor operating system.

16. A device, comprising:
a first translation look-aside buffer (TLB);
page table module to store a plurality of page tables;
a second TLB; and
a control module to:
   provide a virtual address to the first TLB;
   receive a request from the first TLB to access the plurality of page tables in response to the first TLB indicating that the virtual address is not located in the first TLB;
   in a first mode of operation, access the plurality of page tables based on the virtual address in response to the request without accessing the second TLB;
   in a second mode of operation, provide the virtual address to the second TLB in response to the request.

17. The device of claim 16, wherein:
the control module is further to, in the second mode of operation, access the plurality of page tables in response to the second TLB indicating that the virtual address is not located in the second TLB.

18. The device of claim 16, wherein the plurality of page tables comprises a first set of page tables associated with a first operating system and a second set of page tables associated with a second operating system.

19. The device of claim 16, wherein the control module, in the second mode of operation is to:
receive first address information from the second TLB in response to determining providing the virtual address to the second TLB;
select one of the plurality of page tables based on the first address information; and
access the one of the plurality of page tables based on the first address information.

* * * * *